(12) United States Patent
Okuhara et al.

(10) Patent No.: US 8,895,860 B2
(45) Date of Patent: Nov. 25, 2014

(54) GROMMET

(75) Inventors: Takashi Okuhara, Yokkaichi (JP); Tsutomu Sakata, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 170 days.

(21) Appl. No.: 13/643,170

(22) PCT Filed: Dec. 6, 2010

(86) PCT No.: PCT/JP2010/071791
§ 371 (c)(1),
(2), (4) Date: Oct. 24, 2012

(87) PCT Pub. No.: WO2011/155088
PCT Pub. Date: Dec. 15, 2011

(65) Prior Publication Data
US 2013/0043059 A1 Feb. 21, 2013

(30) Foreign Application Priority Data

Jun. 7, 2010 (JP) ................. 2010-130025

(51) Int. Cl.
| | |
|---|---|
| H01B 17/58 | (2006.01) |
| H02G 3/22 | (2006.01) |
| B60R 16/02 | (2006.01) |
| F16L 5/02 | (2006.01) |
| H02G 3/08 | (2006.01) |
| F16L 5/10 | (2006.01) |

(52) U.S. Cl.
CPC .............. *H02G 3/22* (2013.01); *B60R 16/0222* (2013.01); *H02G 3/083* (2013.01); *F16L 5/10* (2013.01)
USPC .................... 174/152 G; 174/153 G; 174/162

(58) Field of Classification Search
CPC ............ B60R 16/0207; B60R 16/0215; B60R 16/0222; H02G 15/18; H02G 3/046; H02G 3/0475; H02G 3/048
USPC ............................................................ 174/152
See application file for complete search history.

(56) References Cited

U.S. PATENT DOCUMENTS

| | | | | |
|---|---|---|---|---|
| 6,495,767 | B2 * | 12/2002 | Okuhara et al. | .......... 174/152 G |
| 6,685,195 | B2 * | 2/2004 | Uchida et al. | ................. 277/628 |
| 2003/0015338 | A1 * | 1/2003 | Sato | ............................ 174/65 G |
| 2004/0154819 | A1 * | 8/2004 | Sakata | ........................ 174/65 G |

FOREIGN PATENT DOCUMENTS

| | | |
|---|---|---|
| JP | 59-114717 | 8/1984 |
| JP | 09-069320 | 3/1997 |
| JP | 2009-296741 | 12/2009 |

OTHER PUBLICATIONS

International Search Report, mail date is Feb. 22, 2011.

* cited by examiner

*Primary Examiner* — Timothy Thompson
*Assistant Examiner* — Michael F McAllister
(74) *Attorney, Agent, or Firm* — Greenblum & Bernstein, P.L.C.

(57) ABSTRACT

When a grommet provided with a wire insertion tubular portion is mounted in a through-hole of a vehicle body panel by engaging a vehicle body engagement recess on an outer periphery of the grommet with a peripheral edge of the through-hole, the present invention prevents the wire insertion tubular portion from being caught by the peripheral edge of the through-hole, bending toward the vehicle body engagement recess side, and being wedged in between the peripheral edge of the through-hole and the vehicle body engagement recess, and thus enables the grommet to be securely mounted in the through-hole. A rib is provided between an outer peripheral surface on a central axis line side of a wire insertion tubular portion and a peripheral wall of a central tubular portion in order to reinforce a base on the central axis line side of the wire insertion tubular portion.

1 Claim, 7 Drawing Sheets

PRIOR ART though wedging of the wire insertion tubular portion 5 causes an incomplete
GROMMET

TECHNICAL FIELD

The present invention relates to a grommet, and more specifically a technology for a grommet provided with a wire insertion tubular portion through which a cable or a hose is inserted, the technology preventing the grommet from being incompletely mounted in a through-hole in a vehicle body panel due to the wire insertion tubular portion being wedged in between a peripheral edge of the through-hole and a vehicle body engagement recess of the grommet when the grommet is mounted in the through-hole by engaging the vehicle body engagement recess with the peripheral edge of the through-hole.

BACKGROUND ART

Conventionally, a grommet is externally fitted to a wire harness routed from an engine compartment to a passenger cabin in an automobile and is mounted in a through-hole in a vehicle body panel that partitions the engine compartment and the passenger cabin. Thereby, the wire harness inserted to the through-hole is protected, and water, dust, and sound are prevented from leaking from the engine compartment side to the passenger cabin. Further, in many cases, wire materials routed from the engine compartment to the passenger cabin, such as a hood opener cable for opening a hood, a washer hose, a circuit for dealer options, and the like, are inserted through the grommet.

Examples of grommets of this type include a grommet described in Japanese Patent Laid-Open Publication No. 2009-296741 (Patent Literature 1). As shown in FIGS. 7 to 9, a grommet 1 includes a small diameter tubular portion 2 and a large diameter tubular portion 3. The small diameter tubular portion 2 has a central through-hole 2a to which a wire harness W/H is snugly inserted. The large diameter tubular portion 3 is externally fitted so as to be concentric with the small diameter tubular portion 2 and to have a space between an increased diameter side of the large diameter tubular portion 3 and an outer peripheral surface of the small diameter tubular portion 2. On an outer peripheral surface of the increased diameter end side of the large diameter tubular portion 3, a vehicle body engagement recess 4 is provided to engage with a peripheral edge 7a of a through-hole 7 in a vehicle body panel 6 partitioning an engine compartment (X) and a passenger cabin (Y). In addition, a wire insertion tubular portion 5 projects toward a decreased diameter end side from a position off a center of the large diameter tubular portion 3, the wire insertion tubular portion 5 having a wire material, such as an opener cable, a washer hose, or the like, inserted therethrough. While a tip of the wire insertion tubular portion 5 is a closed end, a rib-shaped cut line 5a indicating a position to cut and open up the closed end is provided on an entire periphery of the wire insertion tubular portion 5. Accordingly, the closed end of the wire insertion tubular portion 5 can be opened up by making a cut at the cut line 5a when the wire material such as the cable, the hose, or the like is to be inserted.

The grommet 1 attached to the wire harness W/H is simply pressed into the through-hole 7 of the vehicle body panel 6 with the decreased diameter end side first in a direction from an engine compartment (X) to a passenger cabin (Y), as shown with arrows in FIG. 8(A). The vehicle body engagement recess 4 of the grommet 1 thus engages with the peripheral edge 7a of the through-hole 7, as shown in FIG. 8(B), and thereby, mounting of the grommet 1 in the through-hole 7 is completed.

When the grommet 1 is mounted in the through-hole 7, however, it is difficult to straightly insert the grommet 1 such that a central axis line of the grommet 1 is aligned with an axis line of the through-hole 7. The grommet 1 is thus often in a shifted state to some extent when inserted. In such a case, when the through-hole 7 is a hole having a burr, the rib-shaped cut line 5a of the wire insertion tubular portion 5 may be caught by the projecting peripheral edge 7a, as shown in FIG. 9. Accordingly, the wire insertion tubular portion 5 may bend toward the vehicle body engagement recess 4 side and be wedged in between the peripheral edge 7a of the through-hole 7 and the vehicle body engagement recess 4. Such wedging of the wire insertion tubular portion 5 causes an incomplete fitting between the vehicle body engagement recess 4 of the grommet 1 and the peripheral edge 7a of the through-hole 7, resulting in an unsecured mounting of the grommet 1 in the through-hole 7.

CITATION LIST

Patent Literature

Patent Literature 1: Japan Laid-Open Publication No. 2009-296741

SUMMARY OF INVENTION

Problem to be Solved

When a vehicle body engagement recess on an outer periphery of a grommet having a wire insertion tubular portion is engaged with a peripheral edge of a through-hole in a vehicle body panel to mount the grommet in the through-hole, an object of the present invention is to prevent the wire insertion tubular portion from being caught by the peripheral edge of the through-hole, bending toward the vehicle body engagement recess side, and being wedged in between the peripheral edge of the through-hole and the vehicle body engagement recess, and accordingly to enable the grommet to be securely mounted in the through-hole.

Solution to Problem

To address the above-described circumstance, the present invention provides a grommet including a central tubular portion for wire harness insertion provided along a central axis line; a large diameter tubular portion continuing to an outer peripheral surface of the central tubular portion via an annular connecting portion and surrounding the central tubular portion so as to have a space therebetween; an annular vehicle body engagement recess provided on an outer peripheral surface of the large diameter tubular portion; and a wire insertion tubular portion projecting from a peripheral edge of an opening in the annular connecting portion in a position eccentric around the central tubular portion, at least one of a cable and a hose being inserted through the wire insertion tubular portion. A rib is provided between an outer peripheral surface on the central axis line side of the wire insertion tubular portion and a peripheral wall of the central tubular portion in order to reinforce a base on the central axis line side of the wire insertion tubular portion.

As described above, in order to reinforce the base on the central axis line side of the wire insertion tubular portion, the grommet of the present invention includes the rib provided between the outer peripheral surface on the central axis line side of the wire insertion tubular portion and the peripheral wall of the central tubular portion through which the wire harness is inserted. Therefore, even when the wire insertion tubular portion is caught by the peripheral edge of the through-hole in the vehicle body panel during a process to mount the grommet in the through-hole by engaging the peripheral edge of the through-hole in the vehicle body with the vehicle body engagement recess on the outer peripheral surface of the grommet, the outer peripheral surface on the central axis line side of the wire insertion tubular portion is supported by the rib. Accordingly, the wire insertion tubular portion is prevented from widely bending to the vehicle body engagement recess side on the outer peripheral surface of the grommet. Therefore, wedging of the wire insertion tubular portion between the peripheral edge of the through-hole and the vehicle body engagement recess is prevented, enabling the grommet to be securely mounted in the through-hole.

The rib is preferably provided in a position on a semicircle on the central axis line side of the wire insertion tubular portion, and the rib is preferably either a pair of ribs provided on both sides of a circumferential direction or a rib continuous in the circumferential direction.

Furthermore, the rib-shaped cut line indicating a position to cut and open up a closed end is provided in a circumferential direction on the outer peripheral surface of the wire insertion tubular portion. The cut line is also preferably provided to a portion on a semicircle on an outer peripheral side of the grommet.

Conventionally, there was a case where the rib-shaped cut line provided on the outer peripheral surface of the wire insertion tubular portion was caught by the peripheral edge of the through-hole in the vehicle body and the wire insertion tubular portion was bent toward the vehicle body engagement recess side. As described above, however, the rib-shaped cut line on the outer peripheral surface of the wire insertion tubular portion is not provided to a portion on a semicircle on the central axis line side but only to the portion on the semicircle on the outer peripheral side of the grommet. Thereby, it is possible to widely reduce circumstances where the central axis line side of the wire insertion tubular portion is caught by the peripheral edge of the through-hole at which the wire insertion tubular portion tends to bend toward the vehicle body engagement recess side. In addition, with the cut line provided to the portion on the semicircle on the outer peripheral side of the grommet, the cut position can be clearly recognized and no problem occurs during cutting work.

In the grommet of the present invention, the annular vehicle body engagement recess that engages with the peripheral edge of the through-hole in a vehicle body is provided on the outer periphery on one end side of the large diameter tubular portion, which has a diameter decreasing toward the other end side. The wire insertion tubular portion projects from a peripheral edge of an opening provided to a peripheral wall of the large diameter tubular portion toward a front end side having a decreased diameter. A small diameter portion is provided further toward a tip side than the base in the wire insertion tubular portion. The rib is provided to an outer periphery of the base. In addition, a tip of the small diameter portion is a closed end, which is cut and opened up at the time of wire material insertion in order to enable the wire material insertion.

When the grommet having the configuration above is inserted to the through-hole in the vehicle body with the decreased diameter front end first and the vehicle body engagement recess on the other end having an increased diameter is engaged with the peripheral edge of the through-hole, the wire insertion tubular portion projecting toward the decreased diameter front end side is easily caught by the peripheral edge of the through-hole, especially by a projecting peripheral edge like a burr. As described above, however, with the rib provided to the base of the wire insertion tubular portion, even when the wire insertion tubular portion is caught by the peripheral edge of the through-hole, the small diameter portion on the tip side only warps and the entire wire insertion tubular portion does not bend to the vehicle body engagement recess side. Therefore, wedging of the wire insertion tubular portion can be effectively prevented.

Advantageous Effects of Invention

As described above, in a grommet of the present invention, a rib is provided between a peripheral wall of a central tubular portion, through which a wire harness is inserted, and an outer peripheral surface on a central axis line side of a wire insertion tubular portion in order to reinforce a base on the axis line side of the wire insertion tubular portion. Accordingly, even when the wire insertion tubular portion is caught by a peripheral edge of a through-hole during a process to mount the grommet in the through-hole by engaging a peripheral edge of the through-hole in a vehicle body panel with a vehicle body engagement recess on an outer peripheral surface of the grommet, the outer peripheral surface on the central axis line side of the wire insertion tubular portion is supported by the rib. Accordingly, the wire insertion tubular portion does not widely bend to the vehicle body engagement recess side on the outer peripheral surface of the grommet. Therefore, the wire insertion tubular portion is prevented from being wedged in between the peripheral edge of the through-hole and the vehicle body engagement recess, enabling the grommet to be securely mounted in the through-hole.

DESCRIPTION OF EMBODIMENT

Figure 1:
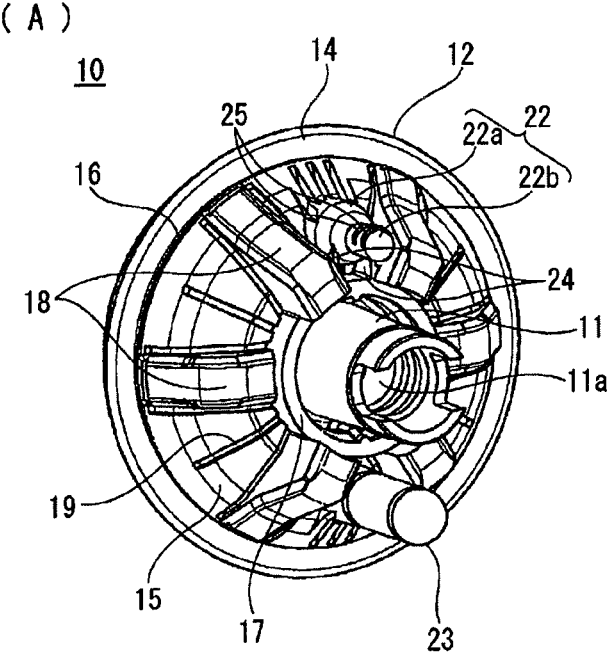
FIG. 1 Diagrams illustrating a grommet of a present embodiment viewed from a pull-out side. (A) A schematic perspective view. (B) An expanded view of a main portion.
Figure 1:
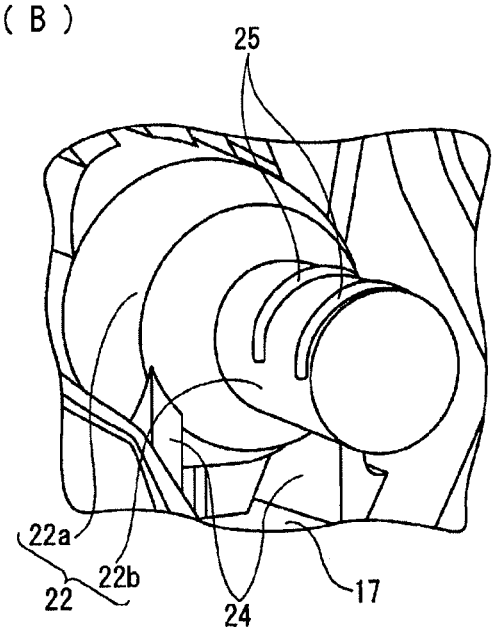
Figure 2:
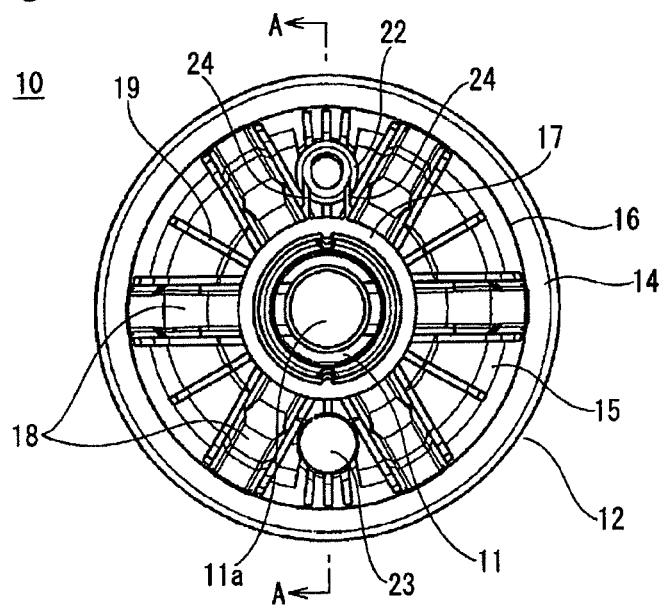
FIG. 2 A side view of the pull-out side of the grommet.
Figure 3:
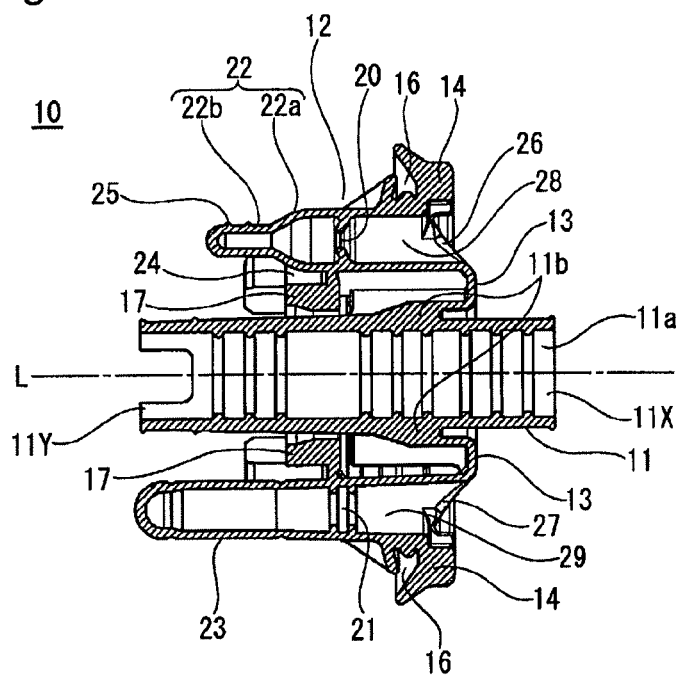
FIG. 3 A cross-sectional view taken along a line A-A in FIG. 2.
Figure 4:
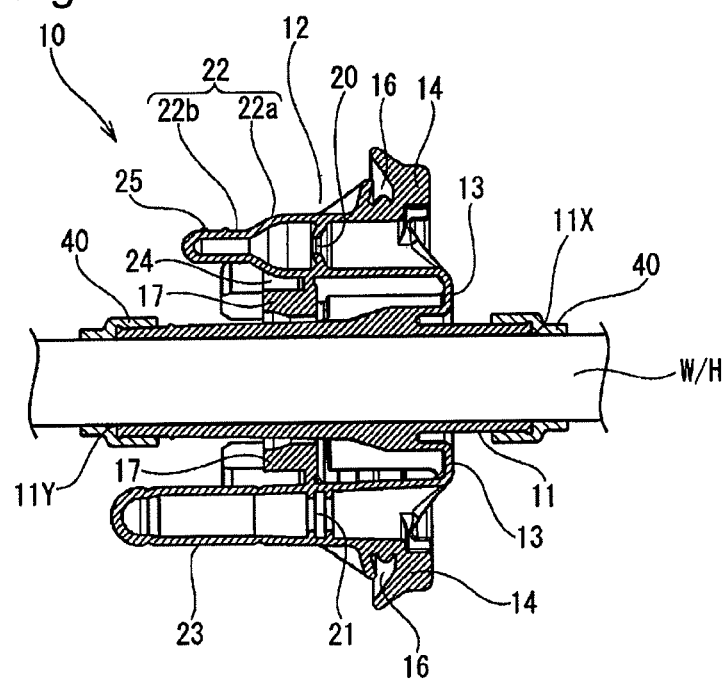
FIG. 4 A schematic cross-sectional view illustrating a state in which the grommet is attached to a wire harness.
Figure 5:
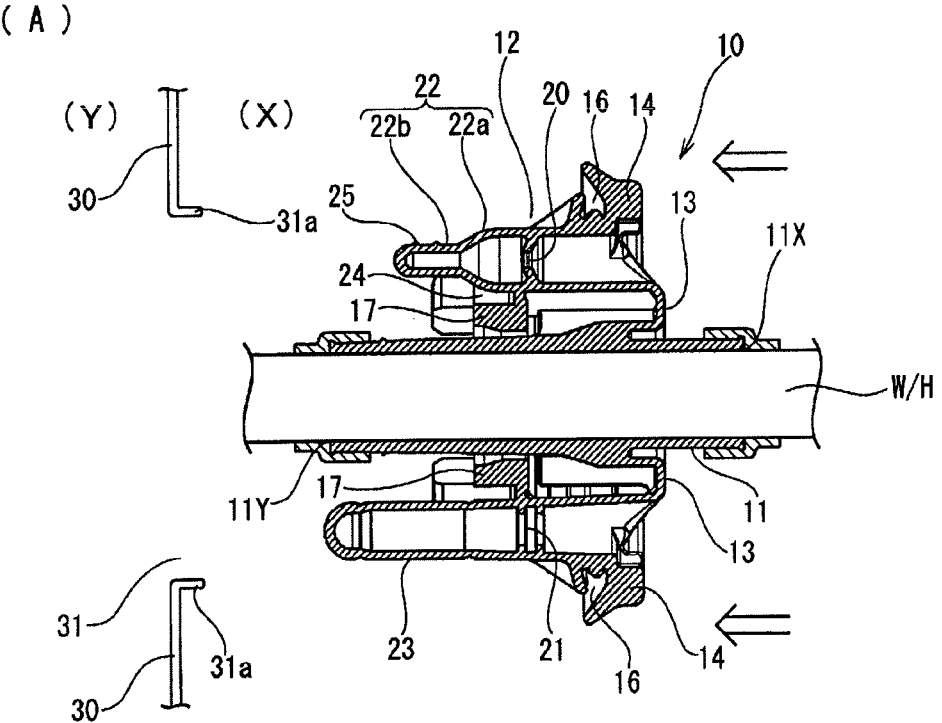
FIG. 5 Schematic cross-sectional views illustrating a procedure to mount the grommet attached to the wire harness in a through-hole in a vehicle body panel. (A) A state before mounting. (B) A state after mounting.
Figure 5:
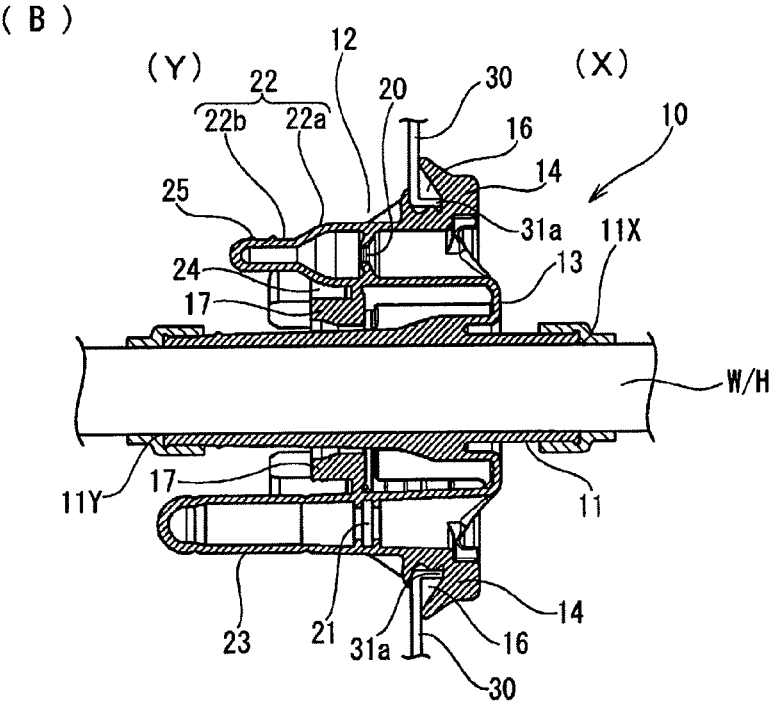

Hereafter, an embodiment of the present invention is described with respect to the drawings. FIGS. 1 to 6 illustrate a grommet of the present embodiment. As shown in FIG. 5, a grommet 10 is attached to a wire harness W/H routed from an engine compartment (X) side to a passenger cabin (Y) side in an automobile through a through-hole 31 provided to a vehicle body panel 30, and is mounted in the through-hole 31 of the vehicle body panel 30. The grommet 10 of the present embodiment is a one-motion-type grommet that can be mounted in the through-hole 31 of the vehicle body panel 30 by simply being pushed in from the engine compartment (X) side. One end of the grommet 10 having an increased diameter is a side to be pressed in, and another end having a decreased diameter is a side to be pulled out. The grommet 10 is integrally molded of rubber or elastomer.

As shown in FIGS. 1 to 6, the grommet 10 includes a central tubular portion 11 having a small diameter and a large diameter tubular portion 12. The central tubular portion 11 defines a central through-hole 11a through which the wire harness W/H is snugly inserted along a central axis line L. The large diameter tubular portion 12 is externally fitted to an outer peripheral surface of the central tubular portion 11 and has a diameter decreasing from the press-in side toward the pull-out side.

The large diameter tubular portion 12 is continuous with an outer peripheral surface 11b at the middle of the central tubular portion 11 in a length direction thereof via an annular connecting portion 13. The large diameter tubular portion 12 is provided to be concentric with the central tubular portion 11 and to have a space between the increased diameter side, which is the press-in side, of the large diameter tubular portion 12 and the outer peripheral surface of the central tubular portion 11. Accordingly, an influence from deformation of the central tubular portion 11 caused by bending or the like of the wire harness W/H is unlikely to be transferred to a portion (vehicle body engagement recess 16 described later) of the large diameter tubular portion 12 engaging with the through-hole 31, and thereby, a high sealing ability can be maintained.

Specifically, the annular connecting portion 13 closes the press-in side of the grommet 10, and the large diameter tubular portion 12 extends in a slope to the pull-out side from a thick wall portion 14 that continues to the outer periphery of the annular connecting portion 13. The large diameter tubular portion 12 is provided with a peripheral wall 15 that continues to the thick wall portion 14 and has a diameter decreasing toward the pull-out side. On an outer peripheral surface at a border between the thick wall portion 14 and the increased diameter end of the peripheral wall 15, an annular vehicle body engagement recess 16 is provided to engage with a burr 31a at a peripheral edge of the through-hole 31, which is a burring hole, provided in the vehicle body panel 30. Further, a pull-out front end side tubular portion 17 extends in parallel with a direction of an axis line of the central tubular portion 11 and continues from the decreased diameter end of the peripheral wall 15.

Moreover, in order to reduce resistance against insertion to the through-hole 31, a plurality of step-shaped projections 18 project in the axis line direction from an outer surface of the peripheral wall 15, the projections 18 extending from the increased diameter end to the decreased diameter end. In the present embodiment, six projections 18 are provided at predetermined distances in a circumferential direction with a projection amount gradually decreasing toward the vehicle body engagement recess 16. In addition, in order to enable the peripheral wall 15 to easily deflect, grooves 19 are provided in portions on the outer surface of the peripheral wall 15 where the projections 18 are not provided. Thereby, the grommet 10 can be easily pressed in.

In the grommet 10 of the present embodiment, the peripheral wall 15 includes openings 20 and 21 through which a hood opener cable and a washer hose are inserted, respectively. From peripheral edges of the openings 20 and 21, wire insertion tubular portions 22 and 23 project toward the decreased diameter end. The wire insertion tubular portion 22 through which the hood opener cable is inserted has a small diameter portion 22b further toward a tip side than a base 22a on a root side. Ribs 24 are provided between an outer peripheral surface in a semicircle position on the central axis line L side of the base 22a and the peripheral wall of the pull-out front end side tubular portion 17. Thereby, the central axis line side of the base 22a of the wire insertion tubular portion 22 is reinforced. In the present embodiment, a pair of ribs 24 are provided on both sides in a circumferential direction in the semicircle position on the central axis line L side. However, one rib that is continuous in the circumferential direction may be provided. Further, in the present embodiment, the ribs 24 are provided on the outer peripheral surface on the central axis line L side of the wire insertion tubular portion 22 through which the hood opener cable is inserted. The wire insertion tubular portion 22 has a relatively narrow diameter and is likely to cause wedging by bending toward the vehicle body engagement recess 16 side. However, a similar rib may be provided, as needed, to an outer peripheral surface of the wire insertion tubular portion 23 through which the washer hose is inserted.

Further, a rib-shaped cut line 25 is provided on the outer peripheral surface of the small diameter portion 22b of the wire insertion tubular portion 22 having the closed end. The cut line 25 is not provided to a semicircle portion on the central axis line L side of the small diameter portion 22b. Instead, the cut line 25 is provided only to a semicircle portion on the vehicle body engagement recess 16 side. When the hood opener cable is inserted to the wire insertion tubular portion 22, a cut is made along the cut line 25 in order to open up the closed end of the small diameter portion 22b of the wire insertion tubular portion 22. In addition, with respect to the wire insertion tubular portion 23 through which the washer hose is inserted, a cut line may be also provided only to a semicircle portion on the outer peripheral surface.

Further, openings 26 and 27 are provided to the annular connecting portion 13 on the press-in side of the grommet 10 in positions opposite to the openings 20 and 21 of the peripheral wall 15, the openings 26 and 27 having the hood opener cable and the washer hose, respectively, inserted therethrough. Insertion portions 28 and 29 are connected to the wire insertion tubular portions 22 and 23 and project toward the interior of the grommet 10 from peripheral edges of the openings 26 and 27.

In order to attach the wire harness W/H to the grommet 10, a group of electric wires in the wire harness W/H is inserted in a state where an internal peripheral surface of the central through-hole 11a of the central tubular portion 11 is widened with a jig (not shown in the drawings). After insertion is completed, the wire harness W/H coming out from both ends (pull-out end 11Y and press-in end 11X) of the central tubular portion 11 is fixated to each of the two ends (pull-out end 11Y and press-in end 11X) of the central tubular portion 11 with an adhesive tape 40 (FIG. 4).

Figure 6:
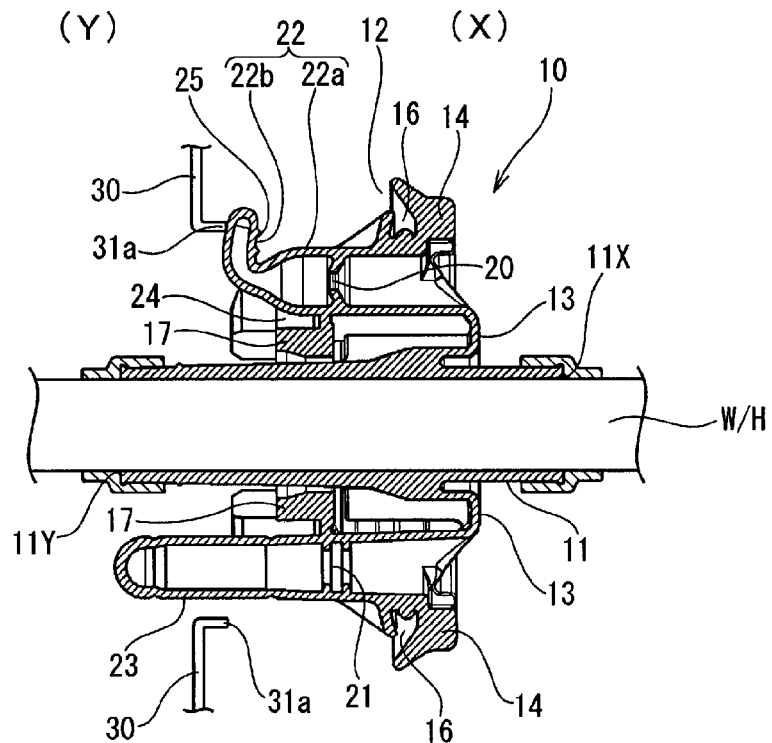
FIG. 6 A schematic view illustrating a state in which a wire insertion tubular portion is caught by a peripheral edge of the through-hole during work to mount the grommet.
Figure 7:
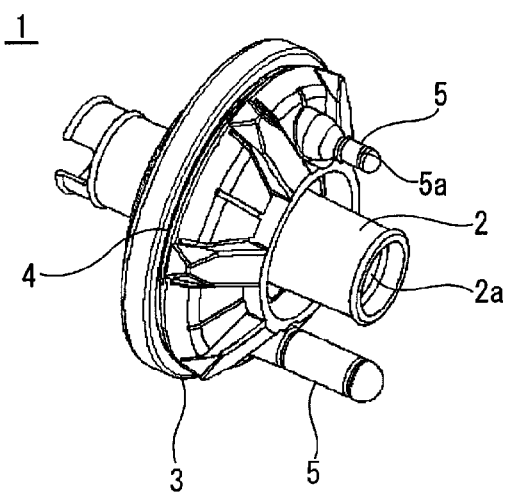
FIG. 7 A diagram illustrating an exemplary conventional art.
Figure 8:
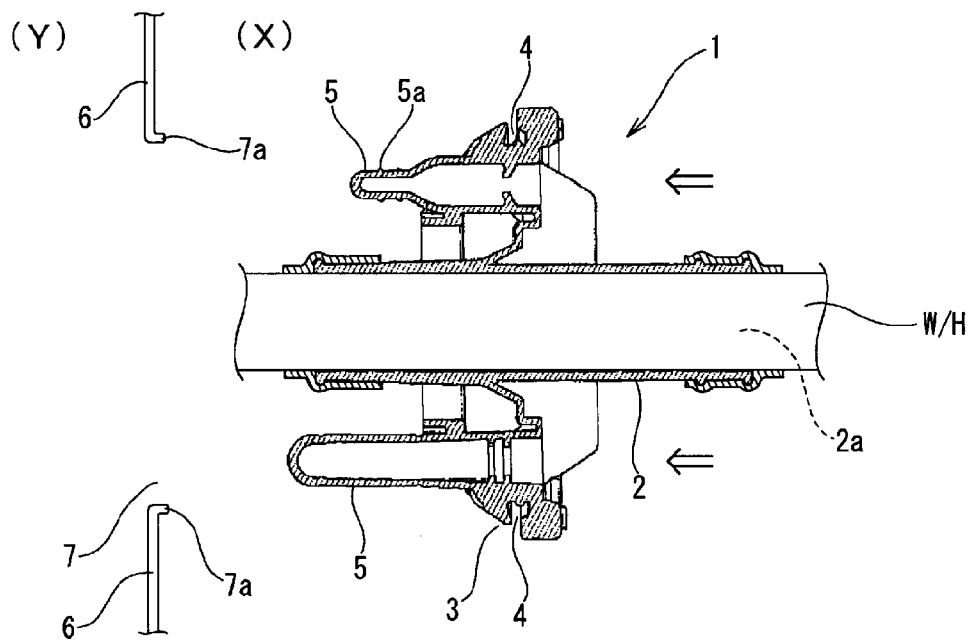
FIGS. 8 (A) and (B) Diagrams illustrating the exemplary conventional art.
Figure 8:
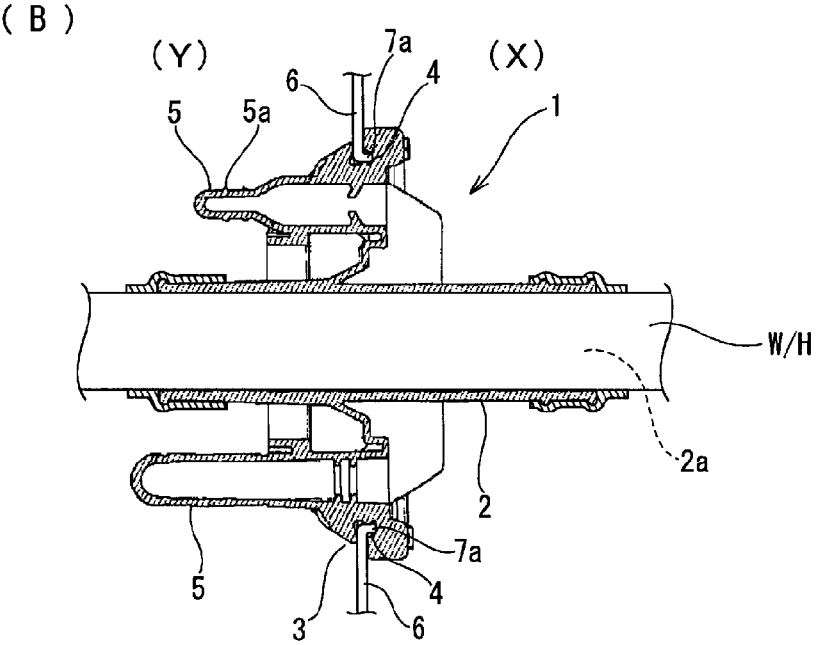
Figure 9:
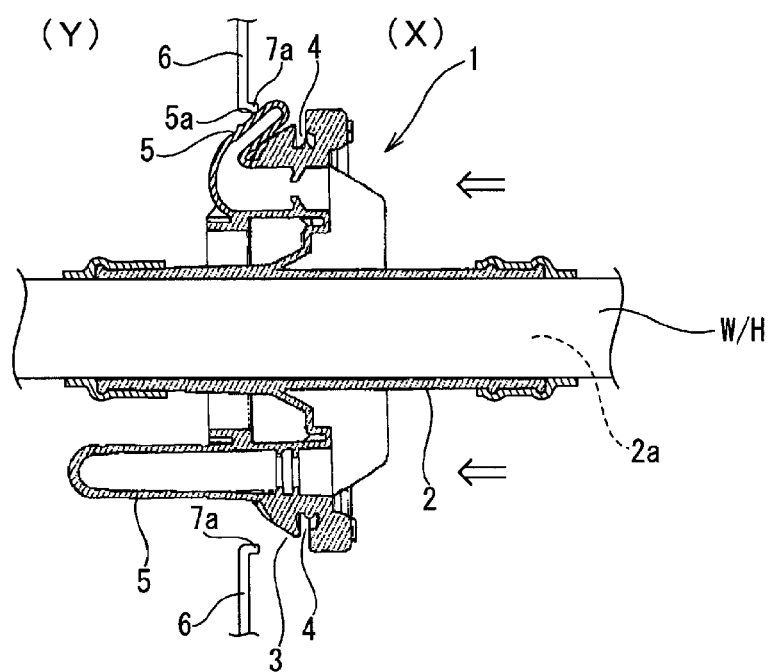
FIG. 9 A diagram illustrating the exemplary conventional art.

As shown in FIG. 5, the grommet 10 attached to the wire harness W/H is inserted and mounted in the through-hole 31 having the burr 31a in the vehicle body panel 30 that partitions the engine compartment (X) and the passenger cabin (Y). In order to mount the grommet 10 in the through-hole 31, the pull-out end 11Y of the central tubular portion 11 on the engine compartment (X) side is first inserted to the through-hole 31 in the vehicle body panel 30, as shown in FIG. 5(A). Then, while the wire harness W/H attached to the grommet 10 is held by a worker, the grommet 10 is pressed into the through-hole 31 with the decreased diameter end side first. During this mounting work, even when the wire insertion tubular portion 22 is caught by the burr 31a of the through-hole 31 projecting toward the engine compartment (X) side, as shown in FIG. 6, the wire insertion tubular portion 22 does not widely bend so as to reach the vehicle body engagement recess 16 on the outer peripheral side. This is because the central axis line L side of the base 22a of the wire insertion tubular portion 22 is reinforced by the ribs 24 provided between the outer peripheral surface on the central axis line L side of the base 22a and the peripheral wall of the pull-out front end side tubular portion 17. Thus, the wire insertion tubular portion 22 is not wedged in between the burr 31a of the through-hole 31 and the vehicle body engagement recess 16. Therefore, the grommet 10 is mounted in the through-hole 31 in a state where the vehicle body engagement recess 16 is securely fitted to the burr 31a, as shown in FIG. 5(B).

Further, the rib-shaped cut line 25 on the outer peripheral surface of the small diameter portion 22b of the wire insertion tubular portion 22 is provided not to the semicircle portion on the central axis line L side but only to the semicircle portion on the vehicle body engagement recess 16 side. Therefore, it is possible to widely reduce circumstances where the wire insertion tubular portion 22 is caught by the burr 31a on the central axis line L side where the wire insertion tubular portion 22 is likely to bend toward the vehicle body engagement recess 16.

REFERENCE SIGNS LIST

10 Grommet
11 Central tubular portion
11a Central through-hole
12 Large diameter tubular portion
16 Vehicle body engagement recess
20, 21 Opening
22, 23 Wire insertion tubular portion
22a Base
22b Small diameter portion
24 Rib
25 Cut line
30 Vehicle body panel
31 Through-hole
31a Peripheral edge of through-hole (Burr)

The invention claimed is:
1. A grommet, comprising
a central tubular portion for wire harness insertion provided along a central axis line;
a large diameter tubular portion continuing to an outer peripheral surface of the central tubular portion via an annular connecting portion and surrounding the central tubular portion so as to have a space there between;
an annular vehicle body engagement recess provided on an outer peripheral surface of the large diameter tubular portion; and
a wire insertion tubular portion projecting from a peripheral edge of an opening in the annular connecting portion in a position eccentric around the central tubular portion, at least one of a cable and a hose being inserted through the wire insertion tubular portion, wherein
a small diameter portion is provided further toward a tip side than a base in the wire insertion tubular portion; one of a pair of ribs and a rib continuous in a semicircular direction, is provided only between an outer surface on a semicircle on the central axis line side of the base and a peripheral wall of the central tubular portion, in order to reinforce the base on the central axis line side of the wire insertion tubular portion; and a rib-shaped cut line at which a closed end at a tip of the small diameter portion is cut and opened up at the time of wire insertion is provided only to a semicircle portion on a vehicle body recess side of the small diameter tubular portion.

\* \* \* \* \*